US009292083B2

(12) United States Patent  
Evertt et al.

(10) Patent No.: US 9,292,083 B2  
(45) Date of Patent: *Mar. 22, 2016

(54) INTERACTING WITH USER INTERFACE VIA AVATAR

(71) Applicant: Microsoft Technology Licensing, LLC, Redmond, WA (US)

(72) Inventors: Jeffrey Evertt, Kirkland, WA (US); Joel Deaguero, Mission Viejo, CA (US); Darren Bennett, Seattle, WA (US); Dylan Vance, Redmond, WA (US); David Galloway, Seattle, WA (US); Relja Markovic, Seattle, WA (US); Stephen Latta, Seattle, WA (US); Oscar Omar Garza Santos, Seattle, WA (US); Kevin Geisner, Mercer Island, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/290,749

(22) Filed: May 29, 2014

(65) Prior Publication Data

US 2014/0267311 A1    Sep. 18, 2014

Related U.S. Application Data

(63) Continuation of application No. 12/814,237, filed on Jun. 11, 2010, now Pat. No. 8,749,557.

(51) Int. Cl.
*G06F 3/01* (2006.01)
*G06T 13/40* (2011.01)

(52) U.S. Cl.
CPC ............. *G06F 3/011* (2013.01); *G06F 3/017* (2013.01); *G06T 13/40* (2013.01)

(58) Field of Classification Search
CPC ................. G06F 3/017; G06F 3/0488; G06F 2203/0381; G06F 3/04815; G06F 3/011; G06K 9/00335; G06K 9/00375; G06T 13/40
See application file for complete search history.

(56) References Cited

U.S. PATENT DOCUMENTS 4,627,620 A    12/1986    Yang
4,630,910 A    12/1986    Ross et al.
(Continued)

FOREIGN PATENT DOCUMENTS

CN    201254344 B    6/2010
EP    0583061 A2    2/1994
(Continued)

OTHER PUBLICATIONS

State Intellectual Property Office of the People's Republic of China, Second Office Action Issued in Chinese Patent Application No. 201110168325.7, Mar. 13, 2014, 9 Pages.
(Continued)

*Primary Examiner* — Haixia Du
(74) *Attorney, Agent, or Firm* — Gregg Wisdom; Judy Yee; Micky Minhas (57) ABSTRACT

Embodiments are disclosed that relate to interacting with a user interface via feedback provided by an avatar. One embodiment provides a method comprising receiving depth data, locating a person in the depth data, and mapping a physical space in front of the person to a screen space of a display device. The method further comprises forming an image of an avatar representing the person, outputting to a display an image of a user interface comprising an interactive user interface control, and outputting to the display device the image of the avatar such that the avatar faces the user interface control. The method further comprises detecting a motion of the person via the depth data, forming an animated representation of the avatar interacting with the user interface control based upon the motion of the person, and outputting the animated representation of the avatar interacting with the control.

20 Claims, 4 Drawing Sheets

(56) References Cited

U.S. PATENT DOCUMENTS

| | | |
|---|---|---|
| 4,645,458 A | 2/1987 | Williams |
| 4,695,953 A | 9/1987 | Blair et al. |
| 4,702,475 A | 10/1987 | Elstein et al. |
| 4,711,543 A | 12/1987 | Blair et al. |
| 4,751,642 A | 6/1988 | Silva et al. |
| 4,796,997 A | 1/1989 | Svetkoff et al. |
| 4,809,065 A | 2/1989 | Harris et al. |
| 4,817,950 A | 4/1989 | Goo |
| 4,843,568 A | 6/1989 | Krueger et al. |
| 4,893,183 A | 1/1990 | Nayar |
| 4,901,362 A | 2/1990 | Terzian |
| 4,925,189 A | 5/1990 | Braeunig |
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,491,743 A | 2/1996 | Shiio et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,697,072 B2 | 2/2004 | Russell et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,894,678 B2 | 5/2005 | Rosenberg et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |

(56) References Cited

U.S. PATENT DOCUMENTS

| | | |
|---|---|---|
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |
| 7,852,262 B2 | 12/2010 | Namineni et al. |
| RE42,256 E | 3/2011 | Edwards |
| 7,898,522 B2 | 3/2011 | Hildreth et al. |
| 8,035,612 B2 | 10/2011 | Bell et al. |
| 8,035,614 B2 | 10/2011 | Bell et al. |
| 8,035,624 B2 | 10/2011 | Bell et al. |
| 8,072,470 B2 | 12/2011 | Marks |
| 8,253,746 B2 | 8/2012 | Geisner et al. |
| 2004/0193413 A1 | 9/2004 | Wilson et al. |
| 2008/0026838 A1 | 1/2008 | Dunstan et al. |
| 2009/0027337 A1 | 1/2009 | Hildreth |
| 2009/0077504 A1 | 3/2009 | Bell et al. |
| 2009/0251460 A1 | 10/2009 | Dunnigan |
| 2010/0306685 A1 | 12/2010 | Giaimo, III et al. |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

State Intellectual Property Office of the People's Republic of China, Third Office Action Issued in Chinese Patent Application No. 201110168325.7, Sep. 22, 2014, 11 Pages.

Kanade et al., "A Stereo Machine for Video-rate Dense Depth Mapping and Its New Applications", IEEE Computer Society Conference on Computer Vision and Pattern Recognition, 1996, pp. 196-202.

Miyagawa et al., "CCD-Based Range Finding Sensor", IEEE Transactions on Electron Devices, vol. 44 No. 10, Oct. 1997, pp. 1648-1652.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: a Review", Jul. 1997, pp. 677-695, vol. 19, No. 7, IEEE Transactions on Pattern Analysis and Machine Intelligence.

Azarbayejani et al., "Visually Controlled Graphics", Jun. 1993, vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

State Intellectual Property Office of China, Office Action of Chinese Patent Application No. 201110168325.7, Jul. 1, 2013, 11 pages.

Yonemoto, et al., "Avatar Motion Control by user Body Postures", Retrieved at << http://delivery.acm.org/10.1145/960000/957088/p347-yonemoto.pdf?key1=957088&key2=9632941721&coll=GUIDe&dl=GUIDE&CFID=84635405&CFTOKEN=83791617 >>, Proceedings of the 11th Annual ACM International Conference on Multimedia, Nov. 2-8, 2003, pp. 347-350.

Li, et al., "Improving the Experience of Controlling Avatars in Camera-based Games Using Physical Input", Retrieved at << http://moraveji.org/images/projects/avatar_disconnection.pdf >>, Proceedings of the 14th Annual ACM International Conference on Multimedia, Oct. 23-27, 2006, 4 pages.

Boulic, et al., "Integration of Motion Control Techniques for Virtual Human and Avatar Real-time Animation", Retrieved at << http://vrlab.epfl.ch/~thalmann/papers.dir/agentlib.pdf >>, Proceedings of the ACM International Symposium on Virtual Reality Software and Technology, Sep. 1997, 12 pages.

Lee, et al., "The Control of Avatar Motion Using Hand Gesture", Retrieved at << http://yu.ac.kr/~cvpr/paper/1998/VRST98_CS.pdf >>, Virtual Reality Software and Technology, Proceedings of the ACM symposium on Virtual reality software and technology, Nov. 2-5, 1998, pp. 7.

Ogi, et al., "High Presence Collaboration Using Plug-in Video Avatar", Retrieved at <<http://lab.sdm.keio.ac.jp/ogi/papers/IDETC2009paper.pdf>>, Proceedings of the ASME 2009 International Design Engineering Technical Conferences & Computers and Information in Engineering Conference, Aug. 30-Sep. 2, 2009, 6 pages.

(56) References Cited

OTHER PUBLICATIONS

Oshita, Masaki, "Motion-Capture-Based Avatar Control Framework in Third-person View Virtual Environments", Retrieved at << http://citeseerx.ist.psu.edu/viewdoc/download?doi=10.1.1.95.3986&rep=rep1&type=pdf >>, Proceedings of the 2006 ACM SIGCHI International Conference on Advances in Computer Entertainment Technology, Jun. 14-16, 2006, 9 pages.

The Patent Office of the State Intellectual Property Office of China, Final Office Action issued in China Patent Application No. 201110168325.7, Apr. 3, 2015, China, 8 pages.

INTERACTING WITH USER INTERFACE VIA AVATAR

CROSS REFERENCE TO RELATED APPLICATIONS

This application is a continuation of U.S. patent application Ser. No. 12/814,237, filed on Jun. 11, 2010, and titled "INTERACTING WITH USER INTERFACE VIA AVATAR," the entire disclosure of which is incorporated by reference.

BACKGROUND

Computer systems are increasingly being configured to accept inputs from natural user interfaces (NUIs) that allow users to interact with a computer system via natural, intuitive motions. For example, a computing system may be configured to accept user inputs in the form of user motions detected by a camera, such as a depth-sensing camera. Images from the camera are analyzed to locate people in the images, and to track motions of those people over time. Filters may then be used to determine whether a detected motion is a recognized user input.

SUMMARY

Various embodiments are disclosed herein that relate to interacting with a natural user interface via feedback provided by an avatar presented on a display. For example, one disclosed embodiment provides a method of presenting a user interface, wherein the method comprises receiving depth data from a depth-sensing camera, locating a person in the depth data, and mapping a physical space in front of the person to a screen space of a display device. The method further comprises forming an image of an avatar representing the person, outputting to the display device an image of a user interface comprising an interactive user interface control, and outputting to the display device the image of the avatar such that the avatar appears to face the user interface control. The method further comprises detecting a motion of the person via the depth data, forming an animated representation of the avatar interacting with the user interface control based upon the motion of the person, and outputting to the display the animated representation of the avatar interacting with the user interface control.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

One difficulty that may be encountered when using a depth-sensing camera to detect gesture-based inputs for a computing system may involve interactions with a user interface presented on a display. A user interface may comprise various controls selectable by a user to cause the execution of actions by the computing system. In the case of a traditional graphical user interface, a person may select a user interface control by moving a cursor over the control via a mouse or other cursor control device, by using a touch-screen input, or in other such manners that involve no spatial ambiguity between the user interface control and the user input mechanism (cursor, finger, etc.).

However, when using a depth-sensing camera to detect gesture-based inputs, some spatial ambiguity may exist when mapping a motion made by a person to a movement of a cursor on a user interface. For example, a length of a person's arms, a person's height, a person's orientation, a distance of the person from the camera, etc. all may affect the perception of a person's motion as viewed by the camera. Therefore, it may be difficult to map the motion of the person's limb to a movement of the cursor relative to the user interface control in a manner corresponding to the intent of the person.

One potential solution to overcoming such difficulties in mapping player motion to cursor motion may be to calibrate user motion to cursor motion. For example, a computing device may ask a user to make a specified motion (e.g. move your arm from a bottom left of the screen to a top right of the screen), and then calibrate the detected range of motion of the person's arm to the screen of the display device. As a person changes location and/or orientation to the screen, the person's motion may be tracked to update the mapping of the motion perceived by the camera to the screen space.

However, such calibration steps may be time-consuming, and also may be disruptive in a dynamic environment where users may be entering and leaving a computing device during a use session (e.g. a video game or other interactive entertainment experience) over time. Therefore, embodiments are disclosed herein that relate to the presentation of a user interface wherein an avatar representing a person currently using the computing system is displayed along with a user interface. Motions of the person are represented by motions of the avatar, such that the motions of the avatar illustrate how the motions of the user are perceived by the computing system. The person may observe how the avatar moves in response to user motions, and therefore may adjust his or her motions to accomplish desired interactions with the user interface. In this manner, calibration may be avoided, as a person may be trained to adjust for any differences between an intended user interface interaction and an actual user interface interaction by observing the motion of the avatar. This may help to reinforce effective user interface interaction methods. Additionally, in some embodiments configured for use by multiple persons at one time, an avatar for each user may be presented, wherein the avatar for the person or persons currently in control of the user interface may be visually distinguished from the avatars for persons not in control of the user interface. Each of these features are described in more detail below.

Figure 1:
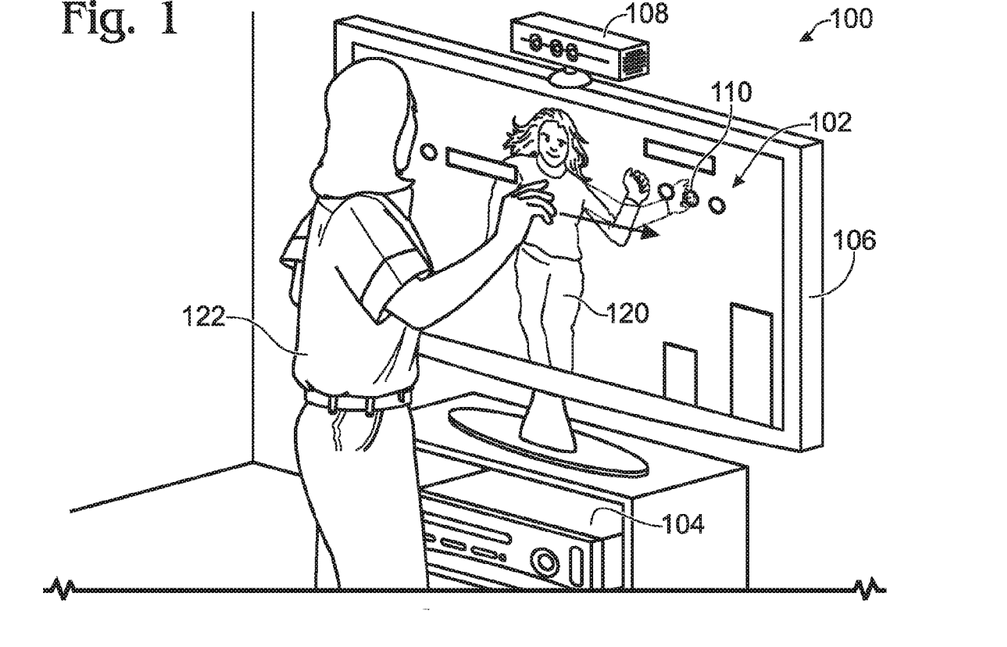
FIG. 1 shows an embodiment of an example use environment for a computing system comprising a camera as an input device, and also illustrates a person interacting with an embodiment of a user interface according to the present disclosure.

FIG. 1 illustrates embodiments of an example computing system 100 and user interface 102. The computing system 100 comprises a computing device 104 (e.g. a video game console, desktop or laptop computer, or other suitable device), a display 106 (e.g. a television, monitor, etc.) on which the user interface 102 is displayed, and an input device 108 configured to detect user inputs.

As described in more detail below, the input device 108 may comprise various sensors configured to provide input data to the computing device 104. Examples of sensors that may be included in the input device 106 include, but are not limited to, a depth-sensing camera, a video camera, and/or a directional audio input device such as a directional microphone array. In embodiments that comprise a depth-sensing camera, the computing device 102 may be configured to locate persons in image data acquired from a depth-sensing camera tracking, and to track motions of identified persons to identify recognized gestures. Gesture inputs, speech inputs, and/or combinations thereof may be used to interact with applications running on the computing device 102. For example, where computing device 102 is a video game console executing an interactive entertainment application, users may control motions of characters displayed on the display 106 via gestures detected by a depth sensor on input device 106.

Further, users also may interact with interactive controls on a user interface displayed on the display 106 via gestures. FIG. 1 shows a schematic representation of an array of interactive controls including example interactive control 110. Such interactive user interface controls may, for example, comprise graphical elements with two or more states that may be changed by user interaction. In many user interfaces, such controls are manipulated via a cursor or the like as controlled by a cursor control device, such as a mouse, trackball, handheld motion sensor, etc. However, as described above, difficulties may be encountered when user inputs are made via user motions detected via a depth-sensing camera, as the user motion as perceived by the camera may vary depending upon user size, location, orientation relative to the input device 108, and other factors.

Therefore, to assist users in interacting with user interface elements, and also to help users learn how user interface interaction gestures are interpreted by the computing device 104, user interface comprises an avatar 120 displayed as facing the user interface controls. Motion of the avatar 120 tracks motion of a person currently using the system ("user") 122, such that the user may move a limb to cause motion of a limb of the avatar relative to the user interface controls. This provides feedback to the user 122 regarding how the avatar's limb motions respond to the user's limb motions, and therefore may help the user to interact with the user interface, as the user can adjust movements to achieve a desired avatar movement, as described in more detail below. In the depicted embodiment, the avatar is displayed as facing the person whom the avatar represents. However, in other embodiments, the avatar may face in any other suitable direction.

The limb of the avatar 122 further may be configured to change configuration when brought into proximity with a user interface element, such as user interface element 110, to indicate to the user 120 that interaction with the user interface element may be performed. For example, a hand of the avatar 120 may change color, position, etc. when close enough to a user interface element to interact with the user interface element. In one more specific embodiment, a hand of the avatar 120 may close over a user interface element to indicate that interaction with the user interface element is enabled.

The avatar 122 may have any suitable appearance. For example, in some embodiments, the avatar 122 may be a literal image of the user as detected via the input device 108, while in other embodiments, the avatar 122 may have an artistic, non-literal appearance. Where the avatar 122 has an artistic, non-literal appearance, the avatar's appearance may be derived from the image of the user as detected via the input device 108, may be based upon an avatar stored in a profile associated with the user, or may be determined in any other manner.

Figure 2:
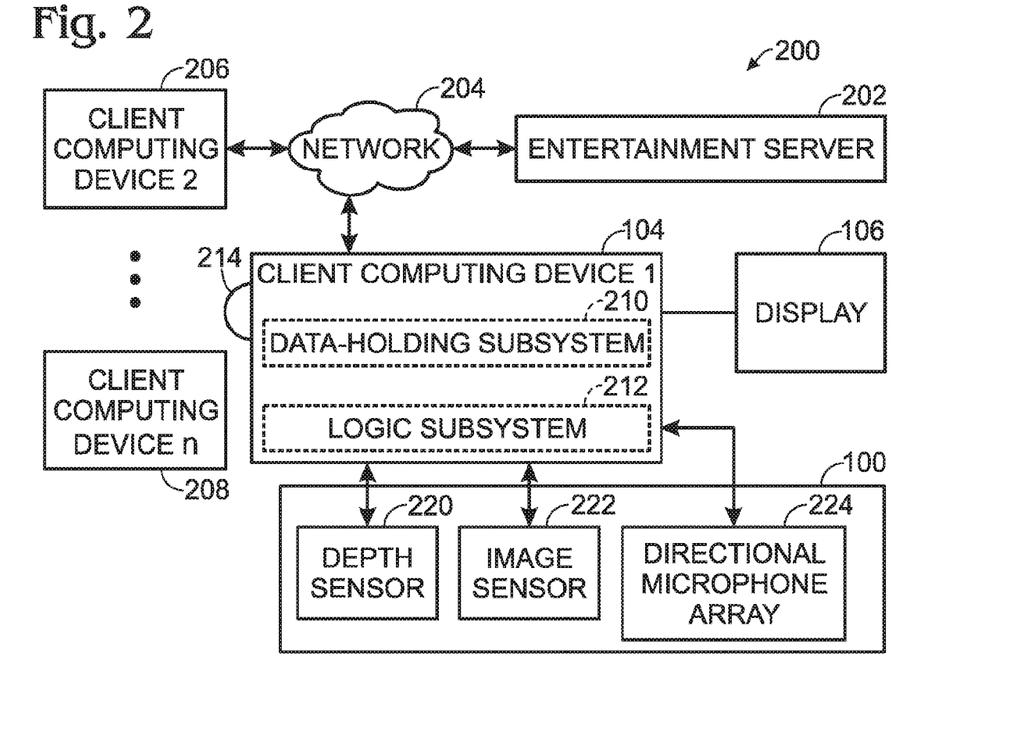
FIG. 2 shows a block diagram of an embodiment of a computing system.

Prior to discussing the presentation of such user interfaces in more detail, an example embodiment of a computing system environment 200 is described with reference to FIG. 2. Computing system environment 200 shows computing device 104 as client computing device 1. Computing system environment 200 also comprises the display 106 and input device 108, and an entertainment server 202 to which computing device 104 is connected via a network 204. Further, other client computing devices connected to the network are illustrated at 206 and 208 as an arbitrary number n of other client computing devices. In this manner, the computing device 104 may run locally stored applications, may run applications accessed on the entertainment server 202, and/or may interact with other client devices 206, 208. It will be understood that the embodiment of FIG. 2 is presented for the purpose of example, and that any other suitable computing system environment may be used, including non-networked environments.

Computing device 104 is illustrated as comprising a logic subsystem 210 and a data-holding subsystem 212. Logic subsystem 210 may include one or more physical devices configured to execute one or more instructions. For example, the logic subsystem may be configured to execute one or more instructions that are part of one or more programs, routines, objects, components, data structures, or other logical constructs. Such instructions may be implemented to perform a task, implement a data type, transform the state of one or more devices, or otherwise arrive at a desired result. The logic subsystem may include one or more processors that are configured to execute software instructions. Additionally or alternatively, the logic subsystem may include one or more hardware or firmware logic machines configured to execute hardware or firmware instructions. The logic subsystem may optionally include individual components that are distributed throughout two or more devices, which may be remotely located in some embodiments.

Data-holding subsystem 212 may include one or more physical devices, which may be non-transitory, and which are configured to hold data and/or instructions executable by the logic subsystem to implement the herein described methods and processes. When such methods and processes are implemented, the state of data-holding subsystem 212 may be transformed (e.g., to hold different data). Data-holding subsystem 212 may include removable media and/or built-in devices. Data-holding subsystem 212 may include optical memory devices, semiconductor memory devices, and/or magnetic memory devices, among others. Data-holding subsystem 212 may include devices with one or more of the following characteristics: volatile, nonvolatile, dynamic, static, read/write, read-only, random access, sequential access, location addressable, file addressable, and content addressable. In some embodiments, logic subsystem 210 and data-holding subsystem 212 may be integrated into one or more common devices, such as an application specific integrated circuit or a system on a chip. FIG. 2 also shows an aspect of the data-holding subsystem 212 in the form of computer-readable removable medium 214, which may be used to store and/or transfer data and/or instructions executable to implement the herein described methods and processes. It will be understood that the entertainment server 202 and other client devices 206, 208 also may comprise logic and data-holding subsystems as described herein.

Display 106 may be used to present a visual representation of data held by data-holding subsystem 212. As the herein described methods and processes change the data held by the data-holding subsystem 212, and thus transform the state of the data-holding subsystem 212, the state of the display 204 may likewise be transformed to visually represent changes in the underlying data. The display 204 may include one or more display devices utilizing virtually any type of technology. Such display devices may be combined with logic subsystem 210 and/or data-holding subsystem 212 in a shared enclosure, or, as depicted in FIG. 1, may be peripheral to the computing device 104.

The depicted input device 108 comprises a depth sensor 220, such as a depth-sensing camera, an image sensor 222, such as a video camera, and a directional microphone array 224. Inputs received from the depth sensor 220 allow the computing device 104 to locate any persons in the field of view of the depth sensor 220, and also to track the motions of any such persons over time. The image sensor 222 is configured to capture visible images within a same field of view, or an overlapping field of view, as the depth sensor 220, and the directional microphone array 224 allows a direction from which a speech input is received to be determined, and therefore may be used in combination with depth data and/or video data to determine a user from which a speech input is received.

It will be appreciated that the particular sensors shown in FIG. 2 are presented for the purpose of example, and are not intended to be limiting in any manner, as any other suitable sensor may be included in input device 106. Further, while the figures herein depict the depth sensor 220, image sensor 222, and directional microphone array 224 as being included in a common housing, it will be understood that one or more of these components may be located in a physically separate housing from the others.

Referring briefly back to FIG. 1, a single user is depicted in front of the input device 108. However, in some embodiments, two or more users may be participating in a multi-user interactive experience with computing device 102. When using a user interface in such situations, there may be some ambiguity as to which player has control of the user interface at any time. To help avoid such ambiguities, in some embodiments, each user within a field of view of the input device 108 may be represented by a different avatar on the user interface. Further, the avatar of the person or persons in control may be visually distinguished from the other avatars so that there is no ambiguity regarding which user or users has or have the ability to interact with the user interface.

Figure 3:
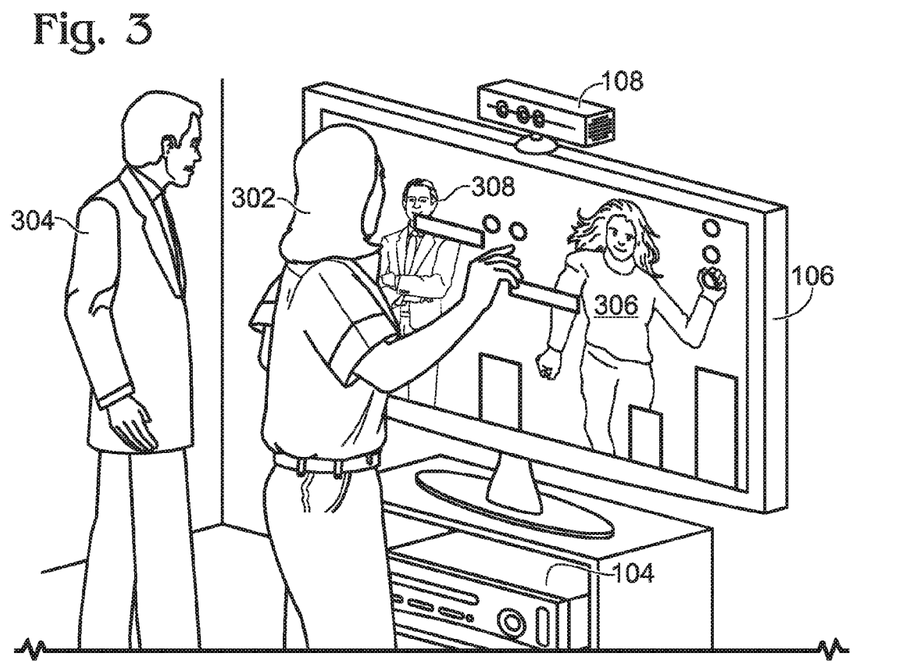
FIG. 3 illustrates one of two players interacting with another embodiment of a user interface according to the present disclosure.
Figure 4:
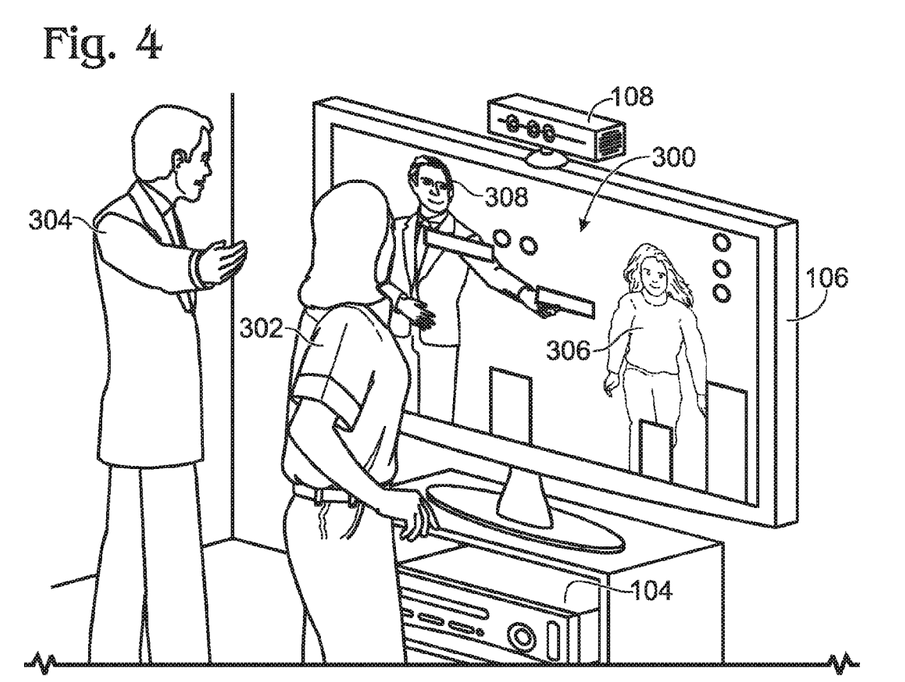
FIG. 4 illustrates the other of two players interacting with the user interface embodiment of FIG. 3.

FIGS. 3 and 4 depict an embodiment of a user interface 300 adapted for use with two or more users at one time, and also depict shows two users 302, 304 standing in front of the input device 108. First regarding FIG. 3, user 302 is depicted as in control of the user interface. As such, the avatar 306 representing user 302 is shown in an interactive pose, wherein a limb of the avatar 306 is extended toward the interactive elements of the user interface. In contrast, the avatar 308 representing user 304 is shown in a non-interactive pose, wherein the limbs of the avatar 308 are not extended toward the interactive elements of the user interface. It will be understood that the avatar representing the user in control of the user interface may be distinguished in any suitable manner from the avatar representing the user or users not in control of the user interface. For example, the avatar representing the user in control of the user interface may be depicted as larger, less transparent, oriented differently, in different colors, etc. compared to the avatar or avatars representing the user or users not in control of the user interface.

The computing system 102 may determine which user is in control of user interface 300 in any suitable manner. For example, the computing system 102 apply various heuristics to the depth data, image data, speech data and/or other input data received from an input device or devices to determine an intent of a user to assume control of the user interface 300. As one more specific example, the computing system 102 may interpret the gesture of a user extending a limb toward the input device 108 as manifesting an intent to control the user interface 300. This is depicted is FIG. 4 by user 304 extending a limb while the limb of user 302 is retracted compared to the pose of user 302 in FIG. 3. In response, the avatar 308 representing user 304 is shown with a limb extended toward a user interface element, while the avatar 306 representing user 302 is shown with limbs not extended toward the user interface elements. While the depicted embodiments shows two users interacting with a user interface, it will be understood that three or more users may interact in a similar manner with a user interface according to the present disclosure.

Figure 5:
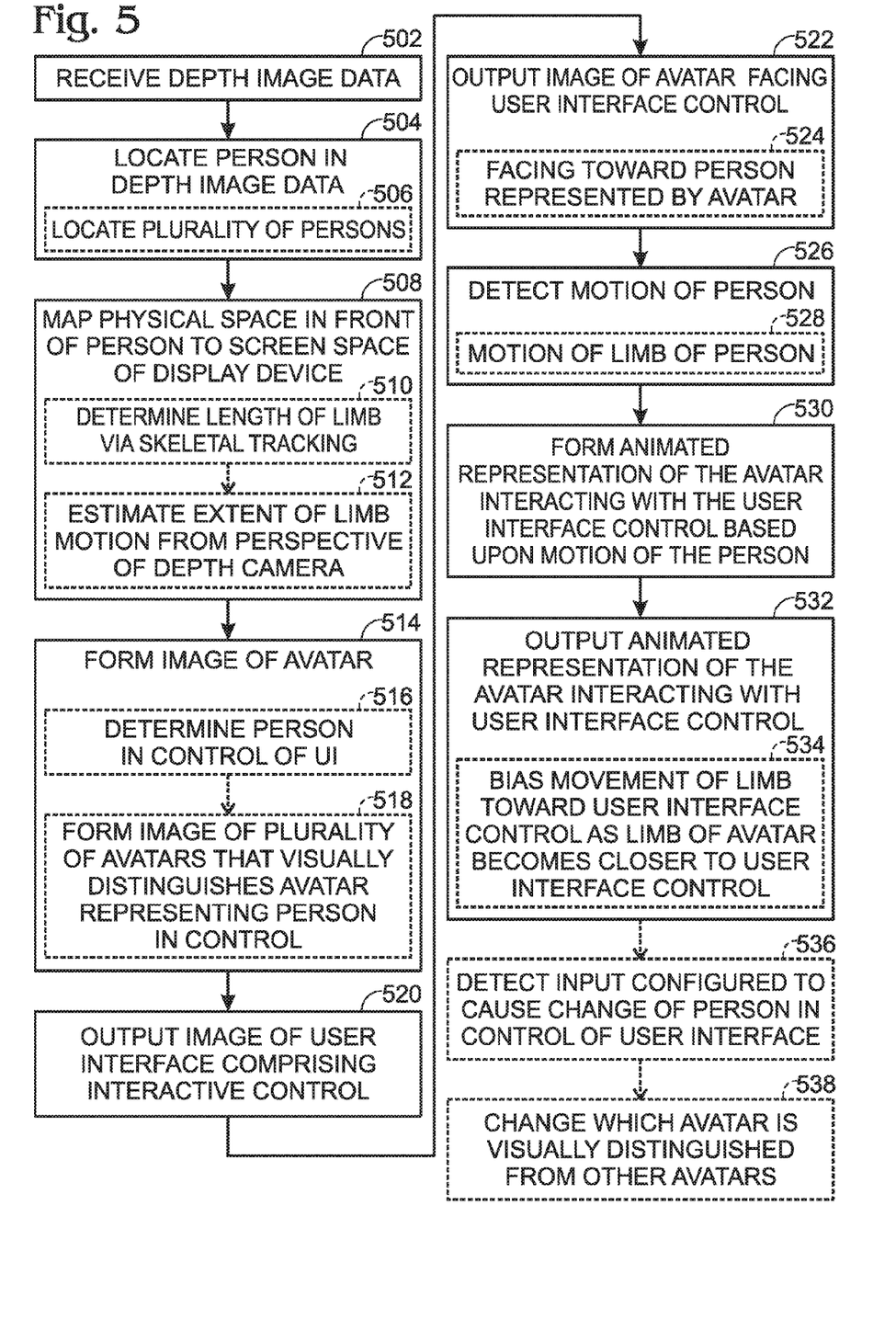
FIG. 5 shows a flow diagram depicting an embodiment of a method of presenting a user interface.

FIG. 5 shows an embodiment of a method 500 of presenting a user interface for a computing device. Method 500 first comprises, at 502, receiving depth data, and at 504, locating a person in the depth data. As indicated at 506, in some embodiments, a plurality of persons may be located in the depth data. Next, as indicated at 508, method 500 comprises mapping a physical space in front of a person (or, where a plurality of persons are located, mapping a physical space in front of each person, or in front of a person determined to be in control of the user interface) to a screen of a display device on which the user interface is presented.

The mapping of the physical space of the person to the display screen space allows movements of a person's limb or limbs to be translated into movements of corresponding limbs of an avatar on the user interface. The physical space of the person may be mapped in any suitable manner. For example, a length of the person's limb may first be estimated from the depth data via skeletal tracking, as indicted at 510. This may involve the determination of the height, orientation, position, distance from the depth-sensing camera, angle of person relative to depth-sensing camera, location of head and shoulders, and other such quantities regarding the person. Then, at 512, an extent of a potential range of motion of the person's limb from the perspective of the depth-sensing camera may be estimated based upon the estimated length of the person's limb. Then the potential range of motion of the person's limb may be mapped to the display screen. It will be understood that the above-described method for mapping a person's physical space to a display space is presented for the purpose of example, and is not intended to be limiting in any manner. It will further be understood that the term "mapping to a display screen" and the like refer to mapping the physical space in front of the user's body to an array of pixels of the resolution of the display device.

Continuing with FIG. 5, method 500 next includes, at 514 forming an image of the avatar to be displayed on the user interface. As mentioned above, the avatar image may correspond to a literal image of a person as detected by a visible image sensor (e.g. a video or still camera), or may correspond to an artistic rendering of the person, e.g. via an avatar file stored in a user profile. Forming the image of the avatar may include determining where the avatar's hand should be positioned relative on the user interface by translating the position of the user's hand to the position of the avatar's hand via the mapping of the user's physical space to the display screen space. Forming the image of the avatar also may include posing of a skeletal model that represents the avatar's body, rendering the model via depth-of-field-related effects, blur (focal or motion), alpha transparency, color intensity, and other such steps.

Where a plurality of persons are detected in the depth data, method 500 may comprise, at 516, determining which person is manifesting an intent to control the user interface. Such an intent may be determined in any suitable manner, including but not limited to via analysis of a user's limb gestures (e.g. extending a limb toward the screen), a user's distance from the screen (e.g. which person is closest to the screen), analysis of voice commands (e.g. detecting a speech command requesting control of the user interface, using directional audio information to determine the person from which the command was received), and/or using any other suitable information. Then, at 518, method 500 may comprise forming an image comprising a plurality of avatars, wherein the avatar that represents the person in control of the user interface is visually distinguished from avatars representing persons not in control of the user interface. The avatar representing the person in control of the user interface may be visually distinguished from the other avatars in any suitable manner, including but not limited to size, posture, color, transparency, blur, location on display screen relative to user interface and other avatars, etc.

Continuing with FIG. 5, method 500 comprises, at 520, outputting to a display an image of a user interface comprising an interactive control, and at 522, outputting an image of the avatar facing the user interface control (e.g. by overlaying or underlaying the image of the avatar onto the image of the user interface). As indicated at 524, the image of the avatar may be presented such that it faces outwardly toward the person represented by the avatar. A transparency of the avatar and user interface elements and/or other graphical characteristic(s) may be adjusted to create a desired visual effect regarding relative locations of the avatar and user interface elements. The avatar image may be oriented directly toward the user interface, or may match the orientation of the user (e.g. if the user is not directly facing the depth-sensing camera). In other embodiments, the image of the avatar may be positioned in front of the user interface from a user's perspective such that the avatar faces away from the user. Further, various visual effects, such as blur, may be applied to the image of the avatar to facilitate the display of the user interface for user comprehension. In either case, it will be noted that the avatar image may not be a direct representation of the user (i.e. a direct reflection where the avatar faces the user), but instead may be modified in position, orientation, etc. to better represent interactions between the avatar and the user interface.

Next, method 500 comprises, at 526, detecting a motion of the person in control of the user interface. The motion may be a motion of the limb of the person, as indicated at 528, or any other suitable motion. The motion may be determined by skeletal tracking techniques based upon the depth data received from the depth-sensing camera, or in any other suitable manner. Then, at 530, method 500 comprises forming an animated representation of the avatar interacting with the user interface control based upon the motion of the person, and, at 532, outputting an animated representation of the avatar interacting with the user interface control. The term "interacting with" may signify that the avatar moves relative to the user interface control (e.g. either closer to or farther from the user interface control), that the avatar enters into or exits from an interaction-enabled state wherein the avatar can manipulate the user interface control, or any other suitable motion or action on the user interface. As a more specific example, when a hand of the avatar touches a user interface control, the hand may change in configuration (e.g. grip the user interface control, or extend one or more fingers to press a user interface control configured as a button), in color, brightness, size, or in any other suitable manner.

Likewise, the animated representation of the avatar may be produced in any suitable manner. For example, inverse kinematics may be utilized to determine the configuration of the avatar's limb based upon a mapping of a location of the avatar's hand based upon the location of the user's hand as determined from skeletal tracking.

Figure 6:
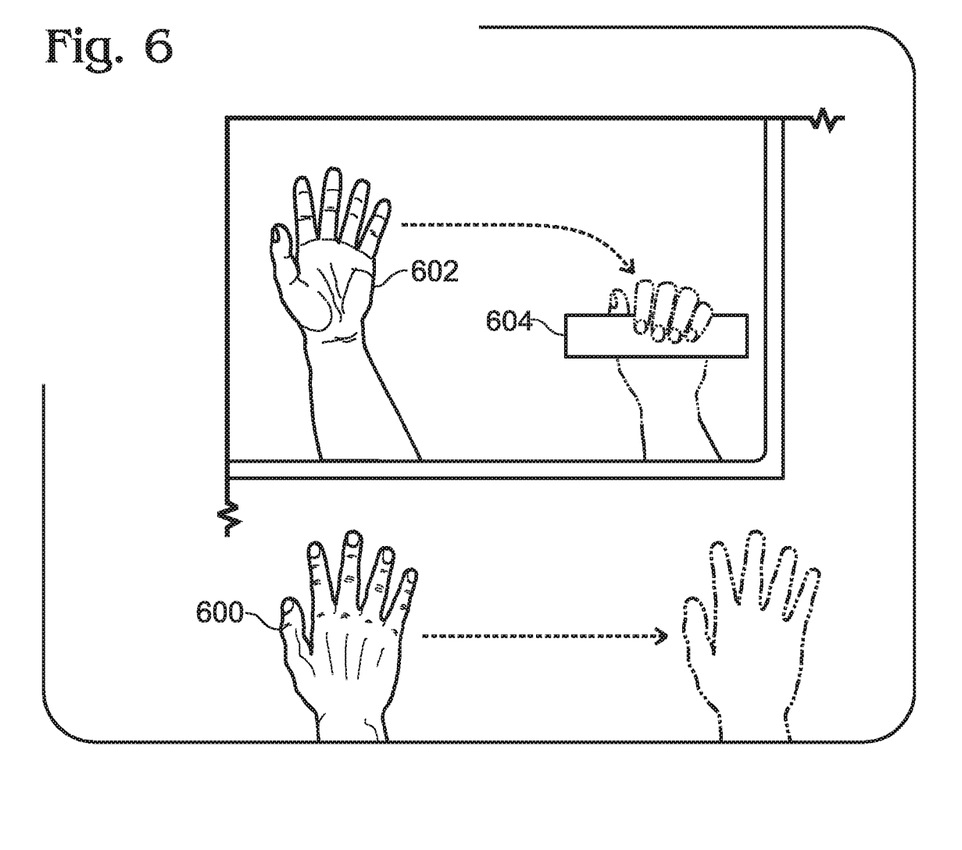
FIG. 6 shows a schematic depiction of a response of a user interface avatar to a motion of a limb of a person according to an embodiment of the present disclosure.

In some embodiments, as indicated at 534, a motion of the avatar's limb may be biased toward a user interface element as it approaches the user interface element. This may facilitate use of the user interface by guiding the motion of the avatar toward interactive elements. An example of this is illustrated schematically in FIG. 6, where the linear horizontal movement of a person's hand 600 causes motion of an avatar's hand 602 in a same general horizontal direction. However, as the avatar's hand approaches a user interface element 604, movement of the avatar's hand 602 is biased toward the user interface element and away from the horizontal direction of the user's hand 600. It will be understood that the specific embodiment of FIG. 6 is presented for the purpose of example, and is not intended to be limiting in any manner.

Returning to FIG. 5, in embodiments in which a plurality of persons may interact with the user interface, method 500 may comprise, at 536, detecting a user input configured to change which person is in control of the user interface. Any suitable input may be configured to cause such a change, including gesture-based inputs (e.g. a user extending a limb toward the user interface, stepping closer to the user interface, etc.), and/or speech inputs that may be associated with users in the field of view of the depth-sensing camera via directional audio data. In response to such an input, method 500 comprises, at 538, changing which avatar is visually distinguished from the other avatars to reflect the change in person controlling the user interface. As described above, such a change may comprise changing a size, posture, color, transparency, blur, or any other suitable characteristic of the images of the avatars. It will be understood that two or more avatars may interact with a user interface at any one time. In such a case, all currently active avatars may be displayed in a manner that visually signifies that the avatars may interact with the user interface.

The above-described embodiments may help to facilitate the use of a user interface controlled via gestures detected by a depth-sensing camera, and also may help to reinforce user gesture behaviors that result in successful user interface navigation. It is to be understood that the configurations and/or approaches described herein are presented for the purpose of example, and that these specific embodiments are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. In a computing device, a method of presenting a user interface, the method comprising:
receiving depth data from a depth-sensing camera;
locating a plurality of persons in the depth data;
determining a selected person of the plurality of persons to be in control of the user interface relative to one or more other persons of the plurality of persons from one or more of a posture and a gesture of the selected person in the depth data relative to the one or more other persons of the plurality of persons, the one or more of the posture and the gesture comprising one or more characteristics indicative of an intent of the selected person to assume control of the user interface;
forming an image of an avatar representing the selected person;
outputting to the display device an image of a user interface, the user interface comprising an interactive user interface control;
outputting to the display device the image of the avatar such that the avatar appears to face the user interface control;
detecting a motion of the selected person via the depth data; and
outputting to the display device an animated representation of the avatar interacting with the user interface control based upon the motion of the selected person.

2. The method of claim 1, wherein outputting the image of the avatar comprises outputting the image of the avatar such that the avatar appears to face the selected person.

3. The method of claim 1, wherein detecting the motion of the selected person comprises detecting a motion of a limb of the selected person, and wherein forming an animated representation of the avatar comprises forming an animated representation of a limb of the avatar moving relative to the user interface control.

4. The method of claim 1, further comprising mapping the physical space in front of the selected person by performing skeletal tracking of the selected person, determining an orientation and size of the selected person from the skeletal tracking of the selected person, and determining an estimated extent of limb motion of the selected person from a perspective of the depth-sensing camera.

5. The method of claim 1, wherein outputting to the display device the image of the avatar comprises outputting images of a plurality of avatars such that a selected avatar representing the selected person is visually distinguished from other avatars representing other persons.

6. The method of claim 5, wherein the selected avatar is visually distinguished by one or more of size, location in the image, and posture relative to the other avatars.

7. The method of claim 5, further comprising detecting an input configured to cause a change of person in control of the user interface, and in response, changing which avatar is visually distinguished from the other avatars, wherein the input configured to cause the change of person in control of the user interface comprises one or more of a gesture and a posture.

8. A computing device, comprising:
a processor; and
memory comprising instructions executable by the processor to:
receive depth data from a depth-sensing camera;
locate a plurality of persons in the depth data;
determine a selected person of the plurality of persons to be in control of the user interface relative to one or more other persons of the plurality of persons from one or more of a posture and a gesture of the selected person in the depth data relative to the one or more other persons of the plurality of persons, the one or more of the posture and the gesture comprising one or more characteristics indicative of an intent of the selected person to assume control of the user interface;
form an image of an avatar representing the selected person;
output to the display device an image of a user interface, the user interface comprising an interactive user interface control;
output to the display device the image of the avatar such that the avatar appears to face the user interface control;
detect a motion of the selected person via the depth data; and
output to the display device an animated representation of the avatar interacting with the user interface control based upon the motion of the selected person.

9. The computing device of claim 8, wherein the instructions are executable to output the image of the avatar such that the avatar appears to face the selected person.

10. The computing device of claim 8, wherein the instructions are executable to detect the motion of the selected person by detecting a motion of a limb of the selected person, and to form an animated representation of the avatar by forming an animated representation of a limb of the avatar moving relative to the user interface control.

11. The computing device of claim 8, wherein the instructions are further executable to map the physical space in front of the selected person by performing skeletal tracking of the selected person, determine an orientation and size of the selected person from the skeletal tracking of the selected person, and determine an estimated extent of limb motion of the selected person from a perspective of the depth-sensing camera.

12. The computing device of claim 8, wherein the instructions are executable to output to the display device the image of the avatar by outputting images of a plurality of avatars such that a selected avatar representing the selected person is visually distinguished from other avatars representing other persons.

13. The computing device of claim 12, wherein the selected avatar is visually distinguished by one or more of size, location in the image, and posture relative to the other avatars.

14. The computing device of claim 8, wherein the instructions are further executable to detect an input configured to cause a change of person in control of the user interface, and in response, change which avatar is visually distinguished from the other avatars, wherein the input configured to cause the change of person in control of the user interface comprises one or more of a gesture and a posture.

15. A storage device, comprising instructions executable by a computing device to:
receive depth data from a depth-sensing camera;
locate a plurality of persons in the depth data;
determine a selected person of the plurality of persons to be in control of the user interface relative to one or more other persons of the plurality of persons from one or more of a posture and a gesture of the selected person in the depth data relative to the one or more other persons of the plurality of persons, the one or more of the posture and the gesture comprising one or more characteristics indicative of an intent of the selected person to assume control of the user interface;

form an image of an avatar representing the selected person;

output to the display device an image of a user interface, the user interface comprising an interactive user interface control;

output to the display device the image of the avatar such that the avatar appears to face the user interface control;

detect a motion of the selected person via the depth data; and output to the display device an animated representation of the avatar interacting with the user interface control based upon the motion of the selected person.

16. The storage device of claim 15, wherein the instructions are executable to output the image of the avatar such that the avatar appears to face the selected person.

17. The storage device of claim 15, wherein the instructions are executable to detect the motion of the selected person by detecting a motion of a limb of the selected person, and to form an animated representation of the avatar by forming an animated representation of a limb of the avatar moving relative to the user interface control.

18. The storage device of claim 15, wherein the instructions are further executable to map the physical space in front of the selected person by performing skeletal tracking of the selected person, determine an orientation and size of the selected person from the skeletal tracking of the selected person, and determine an estimated extent of limb motion of the selected person from a perspective of the depth-sensing camera.

19. The storage device of claim 15, wherein the instructions are executable to output to the display device the image of the avatar by outputting images of a plurality of avatars such that a selected avatar representing the selected person is visually distinguished from other avatars representing other persons.

20. The storage device of claim 15, wherein the instructions are further executable to detect an input configured to cause a change of person in control of the user interface, and in response, change which avatar is visually distinguished from the other avatars, wherein the input configured to cause the change of person in control of the user interface comprises one or more of a gesture and a posture.

* * * * *